Jan. 21, 1964 J. H. KEMP, JR., ETAL 3,118,400
PALLET
Filed Jan. 22, 1962 5 Sheets-Sheet 2
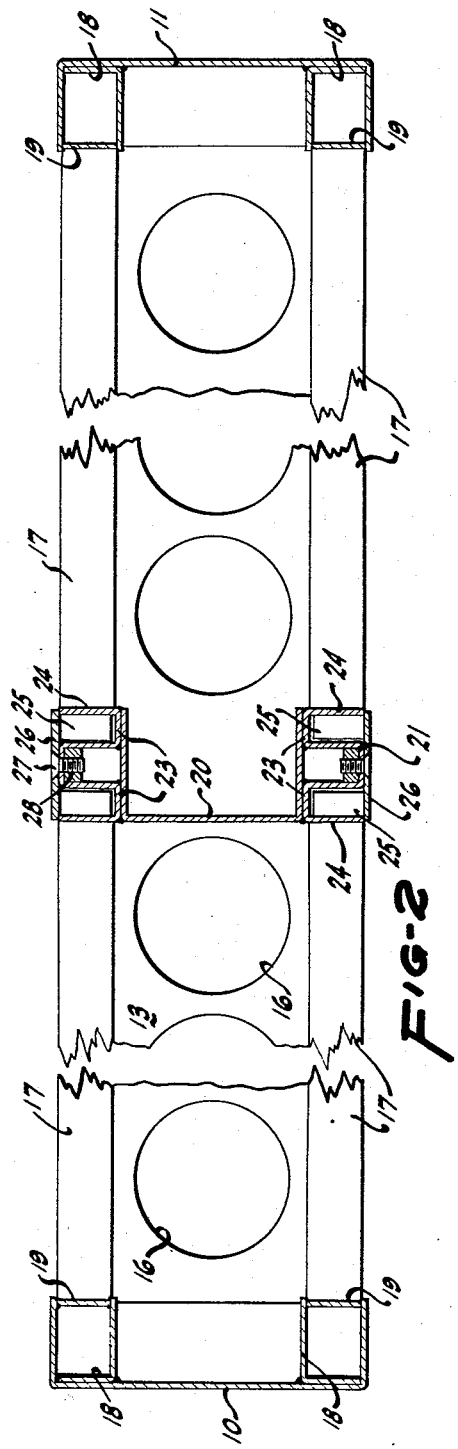
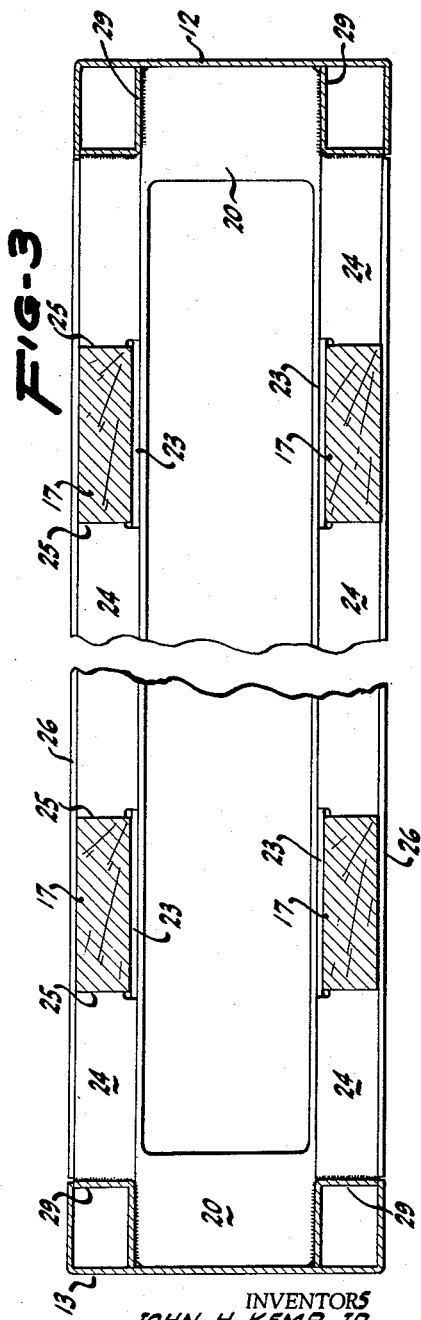
INVENTORS
JOHN H. KEMP, JR.
WILLIAM FUNK
BY
ATTORNEY

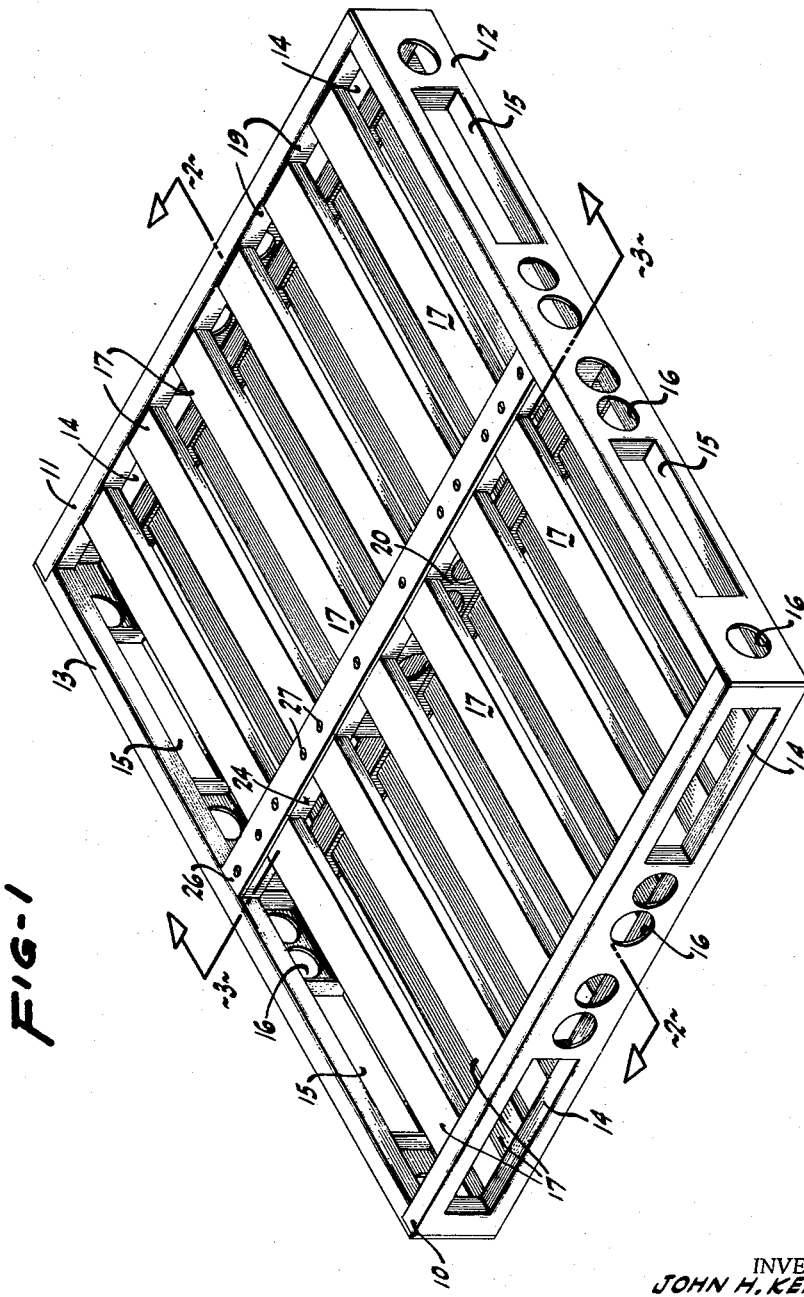

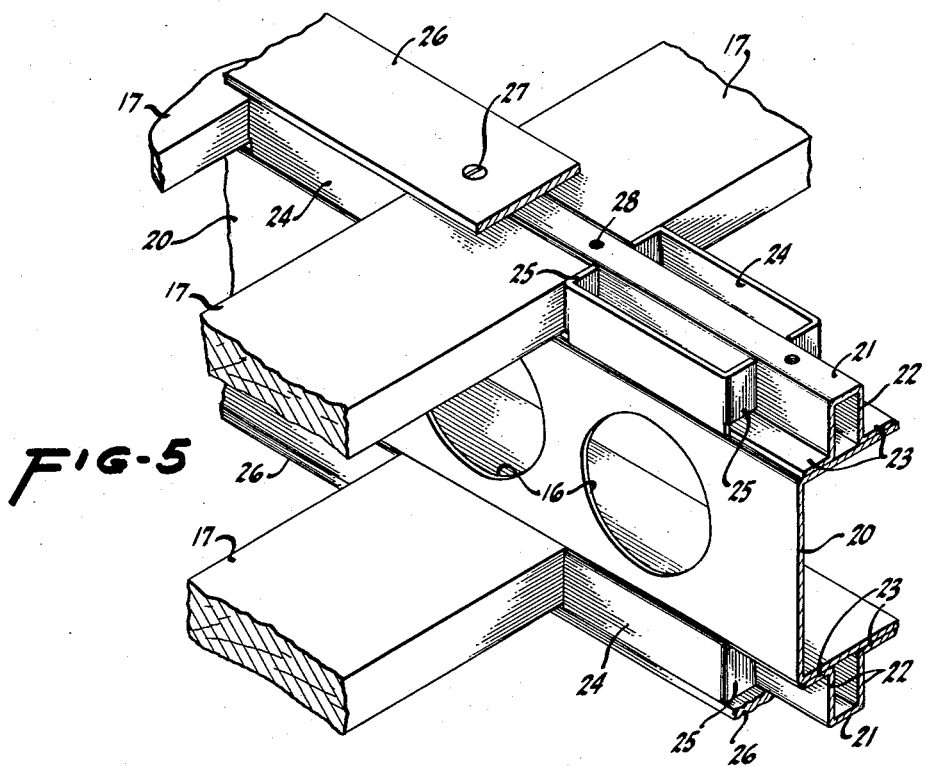
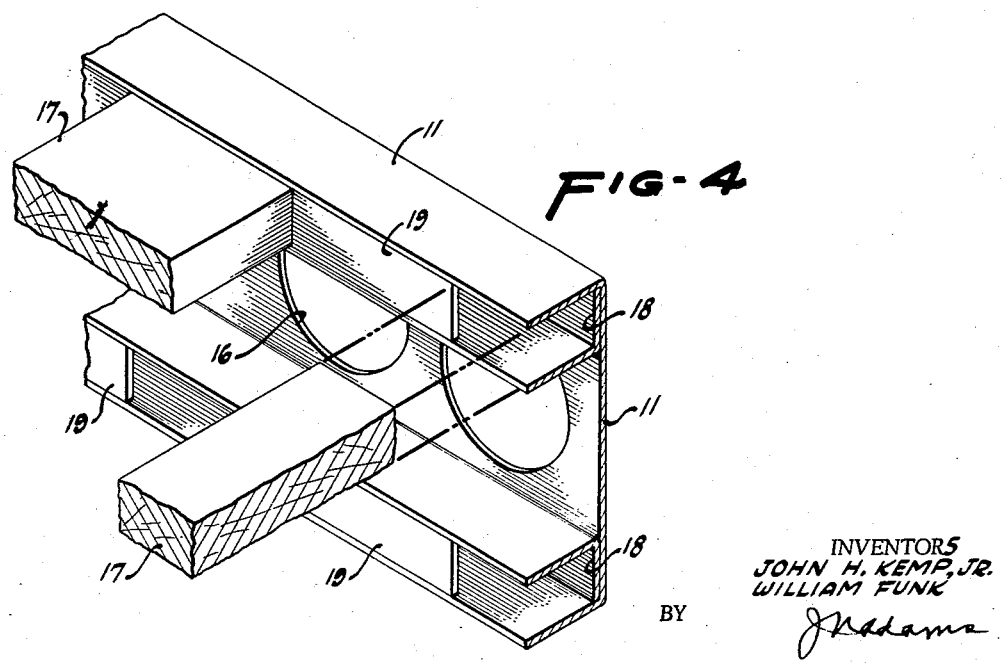

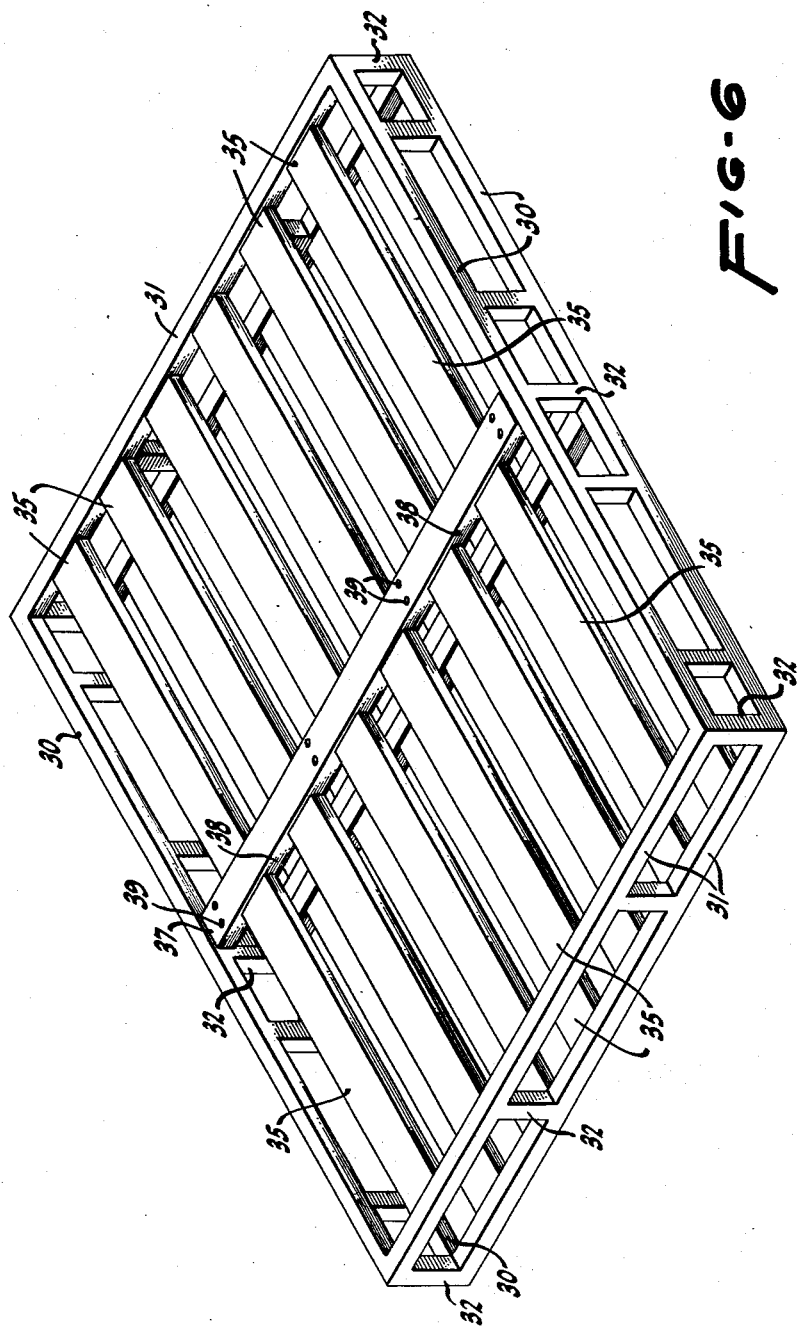

Jan. 21, 1964   J. H. KEMP, JR., ETAL   3,118,400
PALLET
Filed Jan. 22, 1962   5 Sheets-Sheet 5

FIG-7

INVENTORS
JOHN H. KEMP, JR.
WILLIAM FUNK
BY

*J. H. Adams*
ATTORNEY

United States Patent Office 3,118,400
Patented Jan. 21, 1964

3,118,400
PALLET
John H. Kemp, Jr., 140 Greenoak Drive, Atherton, Calif., and William Funk, Stockton, Calif.; said Funk assignor to said Kemp, Jr.
Filed Jan. 22, 1962, Ser. No. 167,665
7 Claims. (Cl. 108—58)

This invention relates to pallets used for the transporting of loads, such as stacked parcels of merchandise. In the overall transportation of palletized loads from the source of origin of the goods to their final destination, it is desirable to transfer the loads at intermediate points from the pallets of one party, such as a trucking firm, to the pallets of another party, such as a warehouse plant. This transfer generally involves, among other steps, the repetitious lifting and setting down of the loaded pallets. Since the load on the pallet may be a ton or more, the pallets are subjected to a very considerable wear and tear.

It is an object of this invention to provide a more efficient pallet for use in handling of palletized loads.

It is another object of the invention to provide a pallet wherein the framework of the pallet is of sturdy material such as welded steel construction and the load-bearing surface carried by said framework consists of wooden slats and wherein said slats constitute essentially the only expendable element throughout the life of the pallet.

Another object is to provide a pallet which is adapted for use with the apparatus for transferring loads from one pallet to another as described in applications for patent filed by John H. Kemp, Jr., Serial No. 111,882 filed March 28, 1961 and Serial No. 155,394 filed November 28, 1961.

Other objects and advantages of the invention will be apparent from the ensuing description.

Preferred forms of the invention are illustrated by way of example in the accompanying drawings and are described in detail hereinafter. The particular constructions herein shown and described are to be construed as illustrative only, and not as limiting the invention.

In the drawings:

FIG. 1 is a view in perspective of one form of our pallet.

FIG. 2 shows a section on line 2—2 of FIG. 1.

FIG. 3 shows a section on line 3—3 of FIG. 1.

FIG. 4 is a perspective and sectional view of a portion of an end of the pallet shown in FIG. 1.

FIG. 5 is a perspective and sectional view of a portion of the partition which extends transversely across the center of the pallet shown in FIG. 1.

FIG. 6 is a view in perspective of a modified form of my pallet.

FIG. 7 is a perspective and sectional view of the end structure of the pallet, also a partly exploded view of that portion of the structure which extends transversely across the center of the pallet shown in FIG. 6.

Referring to the drawings, and first to FIGS. 1 to 5:

A channel bar member 10 extends across and forms one end of the pallet, said pallet, in its general overall form, having the shape of a flat rectangular prism. A like channel bar member 11 extends across and forms the opposite end of the pallet. These members 10 and 11 are preferably of pressed steel construction and are termed channel bars from their having a vertically extending web member and two horizontally extending flange members. Similar channel bar members 12 and 13 extend across the two sides respectively of the pallet, one in each face thereof. These four channel bars, whose flange portions extend inwardly, are welded together at the four corners of the pallet and together constitute a rectangular framework for the entire pallet, with the web portions of the four channel bars functioning as spacer elements, so to speak, between the upper and lower faces of the pallet. Openings 14, generally rectangular in shape, extend through the web portions of the end channel bars 10 and 11, one on each side of the center line of the pallet and permit the insertion and withdrawal of the tines of a lift fork at either end of the pallet. Similar openings 15 extend through the web portions of the side channel bars 12 and 13, respectively, for the insertion and withdrawal of tines of a lift fork. If desired, as for the purpose of lightening the weight of the pallet, other openings 16 may be cut through the web portions of the end and side channel bar members at appropriate positions.

A series of spaced wooden slats 17 extend longitudinally across each half of the upper face of the pallet, from the center of said face to each end of the pallet. Preferably a like series of wooden slats extend across each half of the lower face of the pallet. These slats collectively constitute the load-bearing surface of the pallet and are so spaced as to permit the penetration of the pallet through the openings between said slats of a plurality of vertically extendable pillars in registry with said openings for the lifting of palletized loads from the pallet, as described in the above-mentioned copending applications.

The structure for the anchoring or holding of the slats 17 in proper position at the ends of the pallet will next be described.

An angle bar 18 (FIG. 2 and FIG. 4) extends across one end at the upper face of the pallet and is positioned with its vertical arm against the inner face of the web portion of channel bar 11, with its other arm extending horizontally inwardly from the web portion of said channel bar 11. The length of the vertical arm of said angle bar is such that the clear vertical distance between the flange portion of the channel bar 11 and the horizontal arm of angle bar 18 is slightly greater than the thickness of the slats 17. The said angle bar is appropriately welded to the channel bar 11 so as to be in fixed relationship therewith. This horizontally extending arm of said angle bar constitutes a shelf on which the ends of the slats 17 rest (FIGS. 2 and 4). Vertical plates 19, best seen in FIG. 4, are positioned between the inner edge of the upper flange portion of channel bar 11 and the inner edge of the horizontal arm of angle bar 18 and are welded thereto. The length of said plates 19 is slightly less than the aforesaid spacings between the slats 17. The plates 19 are so positioned that the spacings between said plates will be in registry with the slats 17. It will thus be seen that this structure at the end of the pallet as just described provides that in placing the slats 17 in their ultimate position in the pallet, the outer ends of the slats may simply be inserted through the openings between the vertical plates 19 and pushed back against the vertical web portion of channel bar 11, whereupon the slats may simply rest on the horizontal arm of angle bar 18, without further anchorage.

This same structure, not shown in complete detail in the drawings, but partly shown in FIG. 2, exists at the opposite end of the upper side of the pallet to provide anchorage for the outer ends of the slats which extend longitudinally across the other half of the upper face of the pallet. It exists also at each end of the lower side of the pallet to provide anchorage for the outer ends of the two sets of slats on that side of the pallet.

The structure for the anchorage of the inner ends of the slats 17 along the transverse center line of the pallet will now be described.

A channel bar shaped member 20 extends transversely across the middle of the pallet from the channel bar 12 on one side of the pallet to the channel bar 13 on the other side, and is welded to both said side channel bar members so as to be rigid therewith, the web portion of said channel bar 20 being vertical, and the center lines of the two horizontal flange portions each lying in a vertical plane in which lies the transverse center lines of the upper and lower sides of the pallet. Verticalwise, this channel bar member does not occupy the entire distance between the upper and lower faces of the pallet, the width of its web portion being such that the vertical distance between each of its two flange portions and the upper and lower faces of the pallet provides space on which the inner ends of the slats 17, in conjunction with certain auxiliary elements, hereinafter described, may rest when said slats are in their working position. To provide for proper spacing of the inner ends of the slats 17, a narrow, U-shaped member 21, with the part joining its two arms being flat, and with each of its arms 22 turned outwardly at a right angle to form two horizontal plates 23 (FIGS. 2 and 5) is placed on, and welded to, the outer face of each of the flange portions of the aforesaid channel bar member 20, the distance between the outer edges of said plates 23 being equal to the width of the flange portion of the channel bar member 20, said outer edges also being positioned flush with the edges of said flanges of said member 20. The longitudinal center line of both U-shaped members thus lies in the vertical plane in which lies the transverse center line of the pallet. The two said U-shaped members 21 extend across the pallet from one side to the other. The outer face of their horizontal plate portions, 23, constitute the supports on which the inner ends of the slats 17 rest when in their working position. Vertical plates 24 are positioned at spaced intervals along the outer edge of the plates 23 of the U-shaped members 21 and are rigidly secured thereto; and from each end of said vertical plates 24 a short vertical plate 25, rigidly secured to plate 24, extends inwardly to and fits against the vertical arm members of the U-shaped members 21. The length of the vertical plates 24, and the spacing thereof, are such that the clear distance between the faces of the short vertical plates 25 is slightly greater than the width of the slats 17. These spacings are also in registry with the spacings, hereinbefore described, between the vertical plates 19 at the outer ends of the pallet. Thus when the outer ends of the slats 17 are placed in the spacings between said vertical plates 19 and their inner ends placed in the corresponding spaces between said vertical plates 24 the slats are parallel to the longitudinal center line of the pallet and are in their proper working position on the pallet. A cover plate 26, secured by screws 27 which engage threaded openings 28 in the U-shaped member 21, serves to retain the inner ends of the slats 17 in their aforesaid working position. If desired, threaded blocks 28a (shown in FIG. 2) may be positioned underneath the cover plates 26 for further engagement with the screws 27.

Desirably, and for the purpose of adding stiffness to the framework of the pallet, angle bars 29, shown in FIG. 3, extend throughout the length of the side channel bars 12 and 13 of the pallet at both flange portions of said channel bars, and are positioned so that each said angle bar forms with the web and flange portions of said side channel bars 12 and 13 a tubular bar along each side of the pallet at its upper and lower side edges, the said angle bars 29 being appropriately welded to the side channel bars 12 and 13.

Other means than that described for anchoring the slats may be employed than those above specifically described.

In the modified form of pallet shown in FIGS. 6 and 7 a square tubular bar 30 constitutes each side member of both the upper and lower rectangular frames of the pallet. These bars are preferably made by welded, pressed steel construction. Each end member of both the upper and lower frames of the pallet consist of a square, tube-like bar member 31, said end bar members being made up of composite pieces, as later described, and welded together.

The said side and end bar members are welded together at each corner of the pallet to form the said upper and lower frames of the pallet. Short, square-tubular bars 32 extend vertically between the upper and lower frame members of the pallet and serve to space said frame members apart from each other to give the pallet its proper depth, one such spacer bar being at each corner of the pallet and others intermediate therebetween, said intermediate bars being so spaced as to provide for the insertion and withdrawal of the tines of a lift fork at either end and either side of the pallet, and all said spacer bars being welded to the corresponding upper and lower horizontal tubular bars which constitute said rectangular frames of the pallet. The end bars 31 are each made up of a channel bar 33 (FIG. 7) extending along the entire end of the pallet and positioned with its web portion vertically and its two flange portions extending horizontally inwardly, and a series of short angle bars 34, each said angle bar having its angle adjacent the outer edge of the lower flange of said channel bar, with one arm resting on said lower flange and its other arm extending vertically from the outer edge of the upper flange of said channel bar, said angle bars being appropriately welded to said channel bar so as to be in rigid relationship therewith. The length of said angle bars is slightly less than the spacing between the slats 35, and they are positioned so as to be in registry with the spacings between said slats 35, said slats being of the same structure and positioned in both the upper and lower frames of the pallet in the same manner as the slats 17 in the pallet shown in FIGS. 1–5. In this pallet as shown in FIGS. 6–7 the outer end of each slat 35 is anchored by simply inserting the slat through a space between adjacent vertical arms of angle bars 34 until the end of the slat is in proximity to or against the web portion of channel bar 33. The end of the slat will then rest on the lower flange of the channel bar 33.

The slats 35, extend parallel to the longitudinal axis of the pallet from the ends of the pallet to the middle of the pallet, the same as the slats 17 for the pallet shown in FIGS. 1–5 and described hereinabove.

For the supporting structure and anchorage for the inner ends of slats 35 a pair of angle bars 36 extends across the upper face of the pallet and a similar pair across its lower face, each such pair of angle bars being positioned with one arm of each bar backing against an arm of the other in a vertical plane in which lie the transverse center lines of the upper and lower faces of the pallet, with the other two arms extending horizontally outwardly in opposite directions from each other, i.e., one toward each end of the pallet. The size of these angle bars is such that the vertical arms backing against each other are of a width slightly greater than the thickness of the slats 35. The horizontally extending arms of said bars 36 each constitutes a shelf on which rests the inner ends of the slats 35, said angle bars being also so positioned that when said slats rest upon said horizontal arms they will be in their proper working position in the pallet. The two angle bars of each said pair are appropriately welded together for rigidity of construction, and the pair is welded at each end to the side bar members 30 in both the upper and lower faces of the pallet. Desirably, one of the aforesaid short, vertical tubular bars 32 may be positioned between the junctures of the upper and lower pairs of angle bars 36 with their corresponding side bars 30. Desirably also, similar vertical bars may be positioned at intermediate points between the ends of said pairs of angle bars, space being provided between such intermediate vertical bars for the insertion and withdrawal of the tines of a lift fork through the ends of the pallet. A cover plate 37, of length to extend across the pallet from one side bar 30 to the side bar on the other side of the pallet, is adapted to be positioned along the transverse center line of the pallet and to be over the inner ends of the slats 35 after the latter have been placed on both horizontal arms of the pairs of angle bars 36. Said plate, when in such position will rest on the outer edges of the back-to-back arms of said pairs of angle bars 36. The cover plate 37 is provided with a series of spaced, vertically depending flanges 38 of width such that when the cover plate is in its working position as just above described, the lower or outer edges of said flanges will be in close proximity to the outer edges of the horizontally extending arms of the pairs of angle bars 36. The length of the flanges 38 is such that the spacings between them will be in registry with the inner ends of the slats 35 when the latter are in their working position in the pallet. After the inner ends of the slats 35 are placed in their said working position, the cover plate 37 is brought into contact with the upper edges of the vertically positioned back-to-back arms of the pairs of angle bars 36 and is secured in such position by screws 39 which engage in appropriately threaded holes in blocks 40 which are secured, as by welding, to the arms of the pairs of angle bars 36, said blocks preferably being arranged in pairs with the members of each pair on opposite sides of the back-to-back arms of the angle bars 36.

The same kind of anchorage structure for the slats 35 as that just above described for the upper face of the pallet is provided for the lower face of the pallet when the slats 35 are employed in said lower face of the pallet.

In the pallets as herein described both the upper and lower faces of the pallet are complete with the two sets of slats in each half of each face, together with the anchorage structure for the slats, so that either face of the pallet may serve as the load-carrying platform of the pallet. If desired, only one of the two faces of the pallet may be so equipped. An advantage exists in having both faces of the pallet so equipped, in that if slats on one face of the pallet become broken or otherwise damaged the pallet may be immediately turned over and whereupon its other face becomes the load-carrying platform, thus avoiding an immediate interruption in the use of the pallet for repair of the damaged platform.

An advantage exists in the use of two sets of short slats in each load-carrying platform of the pallet—one set for each half of either upper or lower platform—instead of one set of long slats which extend from one end to the other of the load-carrying platform. The short slats are less subject to becoming broken, warped or split. Moreover, the use of the short slats simplifies the anchoring or fastening structure required to hold the slats in their working position. With the short slats only the one removable fastening device at the mid section of the face of the pallet need be used, whereas with slats that extend the full length of the platform at least two or more removable fastening devices would be required.

Among the advantages of the pallet structure of our invention may be mentioned the following: The pallets are strong and sturdy yet they are of relatively light weight. They can be constructed with relative ease and at relatively low cost. The slats are easy to remove and to install, which is an advantage whenever it is necessary to remove a broken or badly damaged slat and replace it by a new slat. The pallets can be used as ordinary pallets in the conventional way, but unlike most pallets, they can also be used in special systems such as described in copending applications of John H. Kemp, Jr., Serial No. 111,882, filed March 28, 1961, entitled Apparatus for Transferring Loads, and Serial No. 155,394, filed November 28, 1961, entitled System for Transferring Palletized Loads.

In those systems it is advantageous to approach a pallet at different stages of operation, from an end and from a side. The provision of the registering end openings 14 and registering side openings 15 as shown in FIG. 1 (and correspondingly of the registering end openings and registering side openings in FIG. 6) allows such alternative operations as the insertion of the tines of a lift fork from either end and from either side. Moreover, in the systems referred to a pallet is separated from its load at a certain stage of operation, by the passage therethrough of registering top and bottom openings with pallets of FIGS. 1 and 6. This operation is permitted by reason of the registration of the top and bottom slats, hence of the top and bottom openings formed by the spacing of the slats. The construction and design of the guide members of the load-carrying slats of the pallets are such that even when a pallet is partially disassembled and is then reassembled by an unskilled or careless person, the slats and openings must register.

Among variants of the construction described hereinabove and illustrated in the drawings, in the case of a large or exceptionally long pallet, more than one cross member (such as shown at 20 in FIG. 2) may be employed, in which case more than two sets of slats will be used, one set being supported by two cross members.

While we have shown the preferred form of our invention, it is understood that various changes may be made in its construction by those skilled in the art without departing from the spirit of the invention as defined in the appended claims.

We claim:

1. A pallet for handling loads of stacked merchandise, comprising: a pair of rectangular-shaped frames positioned one above the other in parallel planes and in vertically spaced relation; each said frame being made up of two end bars and two side bars rigidly joined together to constitute said frames; spacer members positioned between the corresponding end bars and side bars of said frames and rigidly secured thereto to support said frames in said vertically spaced relation; said spacer members being of such height, and so disposed, as to permit the ready insertion and withdrawal of the tines of a fork lift between said frames at either of the ends or the sides of said frames; a support bar extending across the center of at least one of said frames and rigidly secured to the mid points of the side bars of said frame; spaced slats extending longitudinally from said support bar to each of the end bars of said frame; means associated with said end bars to removably receive the outer ends of said slats and to hold said outer ends substantially in fixed relation to said end bars without the aid of other holding means; means associated with said support bar fixedly securing the inner ends of said slats to said support bar; the spacing of said slats being such that collectively they constitute a load-bearing surface of said pallet while permitting the penetration of the pallet through the openings between said slats of a plurality of vertically extending pillars in registry with said openings for the lifting of palletized loads from said pallet; said spacing of said slats being also such as to permit insertion and withdrawal of the tines of a work lift among such pillars.

2. The pallet of claim 1 wherein said two end bars and said two side bars of said rectangular-shaped frames are tubular in structure.

3. The pallet of claim 1 wherein said two side bars of said rectangular-shaped frames are one-piece rectangular tubular bars and said two end bars are rectangular tubular bars comprised of a composite of different structural elements, and wherein one of said structural elements serves as a support for the outer ends of said slats.

4. The pallet of claim 3 wherein said two side bars of said rectangular-shaped frames are one-piece rectangular tubes and said two end bars are rectangular tubular bars comprised of portions of different structural elements in combination, said element being channel bars and angle bars, and wherein an arm of said angle bar serves as a support for the outer ends of said slats.

5. The pallet of claim 3 wherein said two side bars of said rectangular-shaped frames are one-piece rectangular tubes and said two end bars are rectangular tubular bars comprised of portions of different structural elements in combination, said elements being channel bars and angle bars, and wherein a flange of said channel bar serves as a support for the outer ends of said slats.

6. A pallet of the character described comprising: A substantially parallel end members and two substantially parallel side members; said end and side members having substantial height and being formed with registering openings whereby the tines of a lift fork can be inserted into said pallet between the upper and lower faces thereof from either side and from either end; a cross member extending between and connected to the side members intermediate to the end members; a first set of slats for each face of the pallet extending between one end member and said cross member and a second set of slats for each face of the pallet extending between the other end member and said cross member; and means carried by each end member and by said cross member for receiving, supporting and clamping a first set and a second set of slats on one face of the pallet and a first set and a second set of slats on the other face of the pallet; said means permitting attachment, removal and replacement of any of the slats, and serving also to space the slats uniformly apart and to register them whereby registering slots are formed on the two faces of the pallet.

7. A pallet comprising a substantially rectangular frame formed by two side members and two end members connected together at their ends, at least one cross member extending between and connected at its ends to the side members substantially at their midpoints, a duplicate set of slats each extending between one of the end members and said cross member, and means detachably receiving and holding said slats to permit removal and replacement thereof, said slats being spaced apart to provide alternating slats and slots, said slots allowing penetration of the pallet by vertically movable lift members to support separation of a load from the pallet.

References Cited in the file of this patent
UNITED STATES PATENTS
2,311,280     Quayle _____ Feb. 16, 1943